United States Patent
Fang et al.

(10) Patent No.: US 10,949,415 B2
(45) Date of Patent: Mar. 16, 2021

(54) LOGGING SYSTEM USING PERSISTENT MEMORY

(75) Inventors: Ru Fang, Beijing (CN); Bin He, San Jose, CA (US); Hui-I Hsiao, Saratoga, CA (US); Chandrasekaran Mohan, San Jose, CA (US); Yun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/077,574

(22) Filed: Mar. 31, 2011

(65) Prior Publication Data

US 2012/0254120 A1 Oct. 4, 2012

(51) Int. Cl.
*G06F 16/23* (2019.01)

(52) U.S. Cl.
CPC ................ *G06F 16/2379* (2019.01)

(58) Field of Classification Search
CPC ........ G06F 3/0653; G06F 3/664; G06F 3/067; G06F 11/0727; G06F 11/2057; G06F 17/30135; G06F 16/2379
USPC ......... 707/648, E17.007; 711/120, 122, 128, 711/152, 162; 718/104
See application file for complete search history.

(56) References Cited

U.S. PATENT DOCUMENTS

| | | | | |
|---|---|---|---|---|
| 5,893,155 A | * | 4/1999 | Cheriton | ........................ 711/144 |
| 6,052,695 A | * | 4/2000 | Abe et al. | |
| 7,818,498 B2 | * | 10/2010 | Hitz et al. | ....................... 711/114 |
| 2006/0218200 A1 | * | 9/2006 | Factor et al. | .................. 707/200 |
| 2008/0046443 A1 | * | 2/2008 | Fachan | ................ G06F 12/0804 |
| 2009/0073785 A1 | | 3/2009 | Breitwisch et al. | |
| 2009/0125691 A1 | * | 5/2009 | Nakanishi | ....................... 711/162 |
| 2009/0240664 A1 | | 9/2009 | Dinker et al. | |
| 2010/0037005 A1 | | 2/2010 | Kim et al. | |
| 2010/0118593 A1 | | 5/2010 | Cho et al. | |
| 2011/0072207 A1 | * | 3/2011 | Jin | ....................... G06F 16/2358 711/112 |
| 2011/0222330 A1 | * | 9/2011 | Lee et al. | ........................ 365/100 |
| 2012/0072652 A1 | * | 3/2012 | Celis et al. | .................... 711/103 |

(Continued)

FOREIGN PATENT DOCUMENTS

| JP | 2009283681 | 12/2009 |
|---|---|---|
| WO | 03065377 | 8/2003 |

OTHER PUBLICATIONS

Volos et al. "Mnemosyne: Lightweight Persistent Memory" Computer Scienc Department, University of Wisconsin-Madison ASPOS' 11, Mar. 5-11, 2011, Newport Beach, CA ACM 978-1-4503-0266.*

(Continued)

*Primary Examiner* — Tmara T Kyle
*Assistant Examiner* — Berhanu Mitiku
(74) *Attorney, Agent, or Firm* — Kunzler Bean & Adamson; Bruce R. Needham

(57) ABSTRACT

A computer program product, including: a computer readable storage device to store a computer readable program, wherein the computer readable program, when executed by a processor within a computer, causes the computer to perform operations for logging. The operations include: receiving a transaction including data and a log record corresponding to the data; writing the data to a data storage device; and writing the log record to a log space on a persistent memory device coupled to the data storage device.

15 Claims, 4 Drawing Sheets

(56) References Cited

U.S. PATENT DOCUMENTS

2012/0109895 A1* 5/2012 Zwilling et al. .............. 707/648

OTHER PUBLICATIONS

Thatte "Persistent Memory: A Storage Architecture for Object-Oriented Database Systems" Artificial Intelligence Laboratory, Cmputer Science Center Texas Instruments Incorporated 1986 IEEE.*
Freitas et al. "Storage-class memory: The next storage system technology" IBM J. Res. & Dev. vol. 52 No. 4/5 Jul./Sep. 2008 (Year: 2008).*
Freitas et al. "Storage-class memory: The next storage system technology" (Year: 2008).*
Fang et al. "High Performance Database Logging using Storage Class Memory" (2011), 11 pages.
Condit et al. "Better I/O Through Byte-Addressable, Persistent Memory" SOSP'09, Proceedings of the ACM SIGOPS 22nd Symposium on Operating Systems Principles, (Oct. 2009), pp. 133-146.
"Apache Cassandra" The Apache Software Foundation, available at: http://cassandra.apache.org/, last accessed Mar. 31, 2011, 1 page.
Kallman et al. "H-Store: A High-Performance, Distributed Main Memory Transaction Processing System" Proceedings of the VLDB Endowment, vol. 1, Issue 2, (Aug. 2008), pp. 1496-1499.
Silberschatz et al. "Operating System Concept" Seventh Edition, (2004), pp. 348-350, 12 pages.

* cited by examiner

LOGGING SYSTEM USING PERSISTENT MEMORY

BACKGROUND

In conventional database management systems (DBMSs) and many other computing environments, transactions to write to a data storage device, such as a hard drive, often write data and log records in memory buffers before moving the data and log records to the storage device. This often includes writing the log records to log files on the storage device before any associated data changes are made to the data files (known as write-ahead logging). When a system failure occurs, such as a hardware failure or system power interruption, a recovery process is started upon system restart to read the log files and apply log records to restore the system to a consistent state.

Writing and flushing log records to log files is generally an important step, but because of input/output barriers and latencies in writing to data storage devices, significant overhead may be incurred. Consequently, writing and flushing log records is frequently the key inhibitor for high performance transaction processing.

SUMMARY

Embodiments of a system are described. In one embodiment, the system is a logging system. The system includes: a persistent memory device including a log space; and a data storage device coupled to the persistent memory device, wherein the persistent memory device is configured to receive a log record in the log space corresponding to data to be written to the data storage device. Other embodiments of the system are also described.

Embodiments of a computer program product are also described. In one embodiment, the computer program product includes a computer readable storage device to store a computer readable program, wherein the computer readable program, when executed by a processor within a computer, causes the computer to perform operations for logging. The operations include: receiving a transaction including data and a log record corresponding to the data; writing the data to a data storage device; and writing the log record to a log space on a persistent memory device coupled to the data storage device. Other embodiments of the computer program product are also described.

Embodiments of a method are also described. In one embodiment, the method is a method for logging. The method includes: receiving a transaction including data and a log record corresponding to the data; writing the data to a data storage device; and writing the log record to a log space on a persistent memory device coupled to the data storage device. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
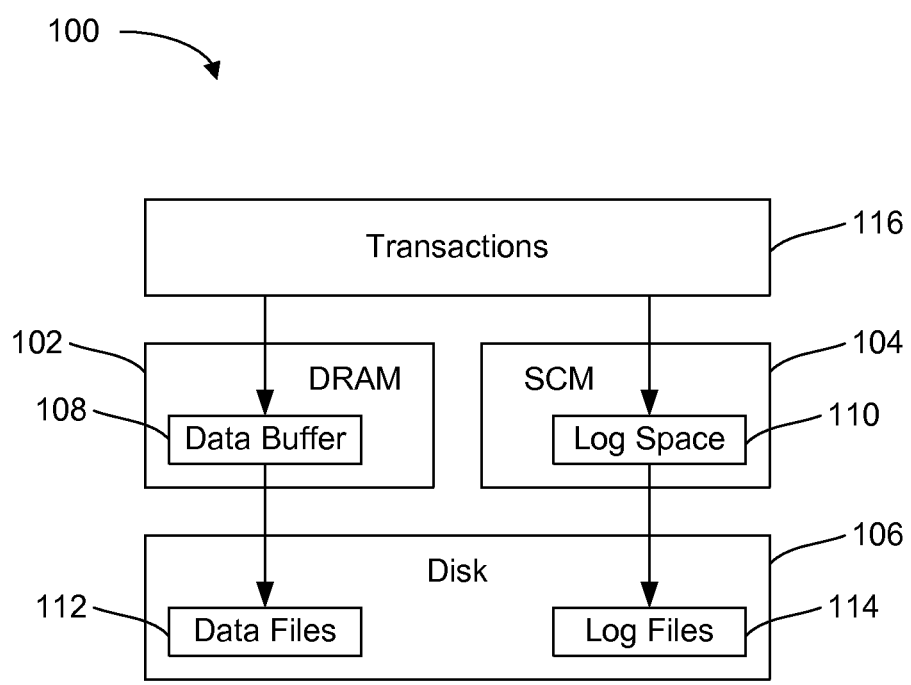
FIG. 1 depicts a schematic diagram of one embodiment of a logging system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for logging in a computing environment. More specifically, the system uses a persistent memory device to receive a transaction and store a log record for the transaction in a log space before writing the log record and data corresponding to the transaction to a data storage device.

In some embodiments, the persistent memory device includes storage class memory (SCM). In one embodiment, the SCM device includes phase change memory (PCM). PCM is a high speed, non-volatile class of memory that allows the memory device and system to operate with high performance, data persistence, and high energy efficiency. PCM is also byte addressable, similar to dynamic random access memory (DRAM), but because PCM is non-volatile, PCM may retain data without an applied voltage or power. While the systems and methods described herein are presented with PCM, any persistent memory device may be used.

Some conventional systems attempt to reduce overhead by using a system-throughput-oriented approach called "group committing," which attempts to reduce the number of disk writes by grouping log writes of multiple committing transactions into a single write to the data storage drive. However, group committing degrades average response time from a single transaction perspective and leads to increased lock/latch contentions. Implementing a logging system using PCM or other persistent memory allows the system to store the log records, and may also allow the persistent memory device to asynchronously archive the log records to the data storage device to avoid some of the disadvantages of conventional systems while improving performance within the computing environment. The system and method described herein may also help with hole detection, partial write detection, and any point crash recovery.

FIG. 1 depicts a schematic diagram of one embodiment of a logging system 100. In one embodiment, the logging system 100 includes a DRAM device 102 and a persistent memory device 104, which may be an SCM device, coupled to a data storage device 106, such as a hard disk drive (HDD). The DRAM device 102 and persistent memory device 104 may be coupled to other components that send transactions 116 to the data storage device 106. The logging system 100 may include more or fewer components than depicted herein.

In one embodiment, the logging system 100 is used in a database management system (DBMS). Logging systems 100 are frequently I/O bottlenecks that decrease efficiency and performance of a DBMS. Consequently, improving the logging system 100 may improve the performance of the DBMS.

In one embodiment, the DRAM device 102 includes or acts as a data buffer 108. Data to be written to the data storage device 106 is received in a transaction 116 by the DRAM device 102 and stored in the data buffer 108. The data buffer 108 holds the data temporarily, and then the data is written to data files 112 on the data storage device 106. Rather than storing the log records in a log buffer on the DRAM device 102, as done in many conventional logging systems 100, the logging system 100 stores the log records in a log space 110 on the persistent memory device 104. The persistent memory device 104 may be a separate device from the DRAM device 102.

In some embodiments, the persistent memory device 104 may act as a long-term data storage device 106 for the log records. In other embodiments, the log records may be flushed asynchronously to log files 114 on the data storage device 106 for long-term preservation. Because the log records are stored in the log space 110 on the persistent memory device 104 rather than in log buffers on the DRAM device 102, the logging system 100 is able to avoid at least some complex buffer management and slow input/output (I/O) to the data storage device 106.

Figure 2:
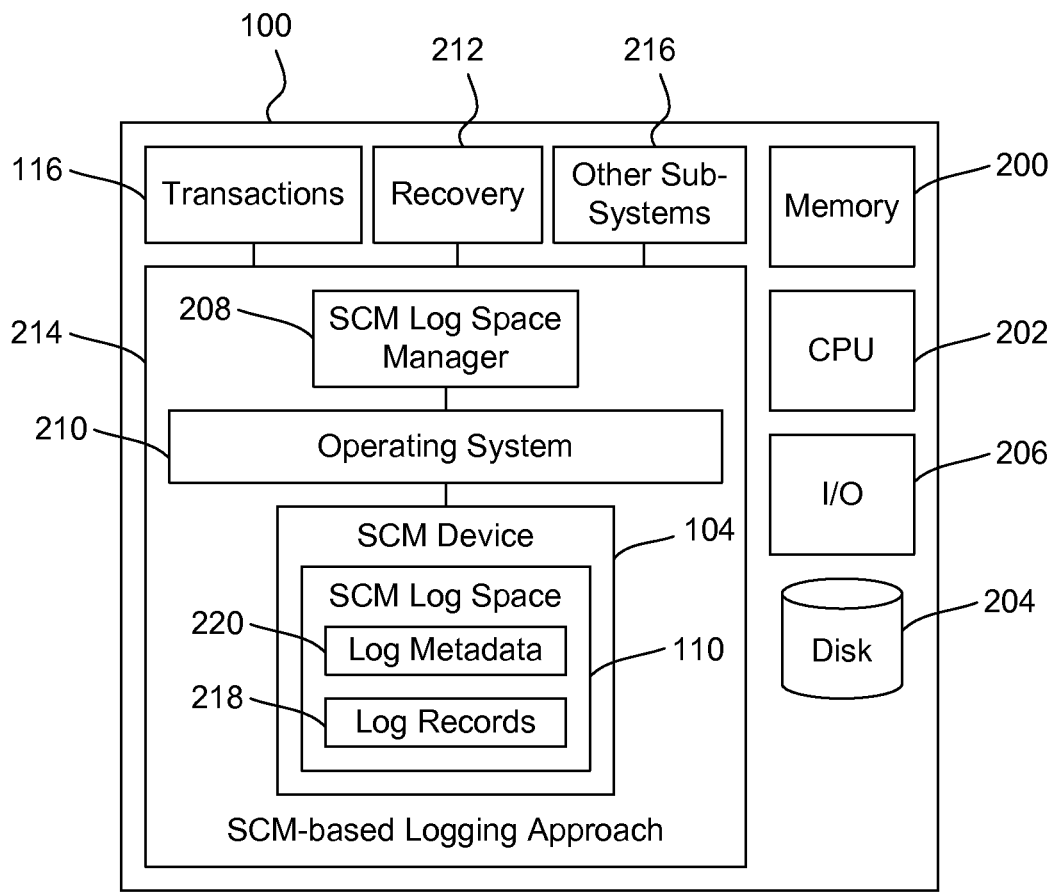
FIG. 2 depicts a schematic diagram of one embodiment of the logging system of FIG. 1.
Figure 5:
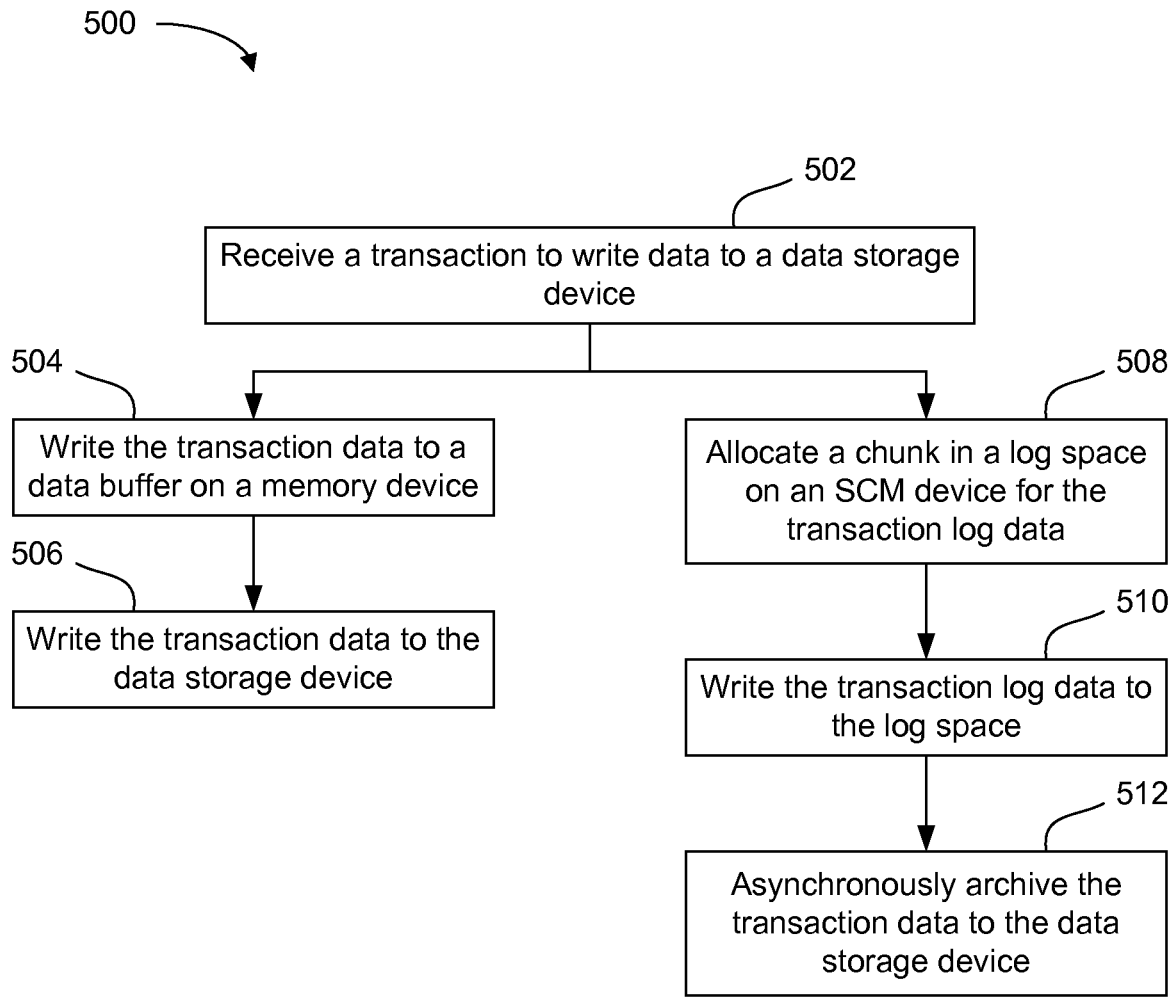
FIG. 5 depicts a flow chart diagram of one embodiment of a method for logging.

FIG. 2 depicts a schematic diagram of one embodiment of the logging system 100 of FIG. 1. The depicted logging system 100 includes various components, described in more detail below, that are capable of performing the functions and operations described herein. In one embodiment, at least some of the components of the logging system 100 are implemented in a computer system. For example, the functionality of one or more components of the logging system 100 may be implemented by computer program instructions stored on a computer memory device 200 and executed by a processing device 202 such as a CPU. The logging system 100 may include other components, such as a disk storage drive 204, input/output devices 206, a log space manager 208, a log space 110, an operating system (OS) 210, a persistent memory device 104, and a recovery subsystem 212. The disk storage drive 204 may be part of or separate from the data storage device 106. Some or all of the components of the logging system 100 may be stored on a single computing device or on a network of computing devices. The logging system 100 may include more or fewer components or subsystems 216 than those depicted herein. In some embodiments, the logging system 100 may be used to implement the methods described herein as depicted in FIG. 5.

In one embodiment, the log space manager 208 and log space 110 are part of an SCM-based logging approach 214 in a DBMS or other computing environment. The SCM-based logging approach 214 may include a logging algorithm specific to the computing environment in which the logging system 100 is implemented. The SCM-based logging approach 214 may be a fundamental function of the DBMS that manages log data in the log space 110 and provides a logging interface to other DBMS subsystems to write log records 218 into the log space 110. The logging system 100 may invoke OS interfaces to communicate with the OS 210 to allocate and initialize a chunk of persistent memory from the underlying SCM device as the log space 110 to store log records 218. As described herein, the logging system 100 may include specialized OS layer support and interfaces to allow the SCM-based logging approach 214 to be used with an OS 210.

The log space 110 may be an SCM log space 110 or a log space 110 corresponding to any type of persistent memory. The log space 110 is a segment in the persistent memory that replaces the log buffers in main memory that are used in conventional logging systems 100. In some embodiments, the log space 110 may also replace the log files 114 on the data storage device 106 to store both log space metadata 220 and transaction logs received in transactions 116 to write data to the data storage device 106. The transactions 116 may be received from computing devices within the database or external to the database.

The persistent memory device 104 stores the log records 218 and log metadata 220 corresponding to a given transaction 116. The log records 218 and log metadata 220 may be stored in the log space 110 on the persistent memory device 104 designated by the SCM-based logging approach 214. The log metadata 220, as described herein, may describe the log space 110 and may be retrieved or changed at runtime by invoking logging interfaces provided by the log space manager 208. The logging system 100 may include any number of persistent memory devices 104.

The log space manager 208 is a management component that may be responsible for performing various logging management operations. In one embodiment, the log space manager 208 communicates with the OS 210 to initialize the log space 110 on the SCM device when log records 218 are to be stored. The log space manager 208 may also remove the log space 110 in response to flushing the log records 218 to the data storage device 106. The log space manager 208 may also allocate chunks from the log space 110 for other DBMS subsystems 216 to write log records 218. The log space manager 208 also manages the log records 218 in the log space 110, such that the log records 218 may be tracked or pointers to the log records 218 may be stored.

Figure 3:
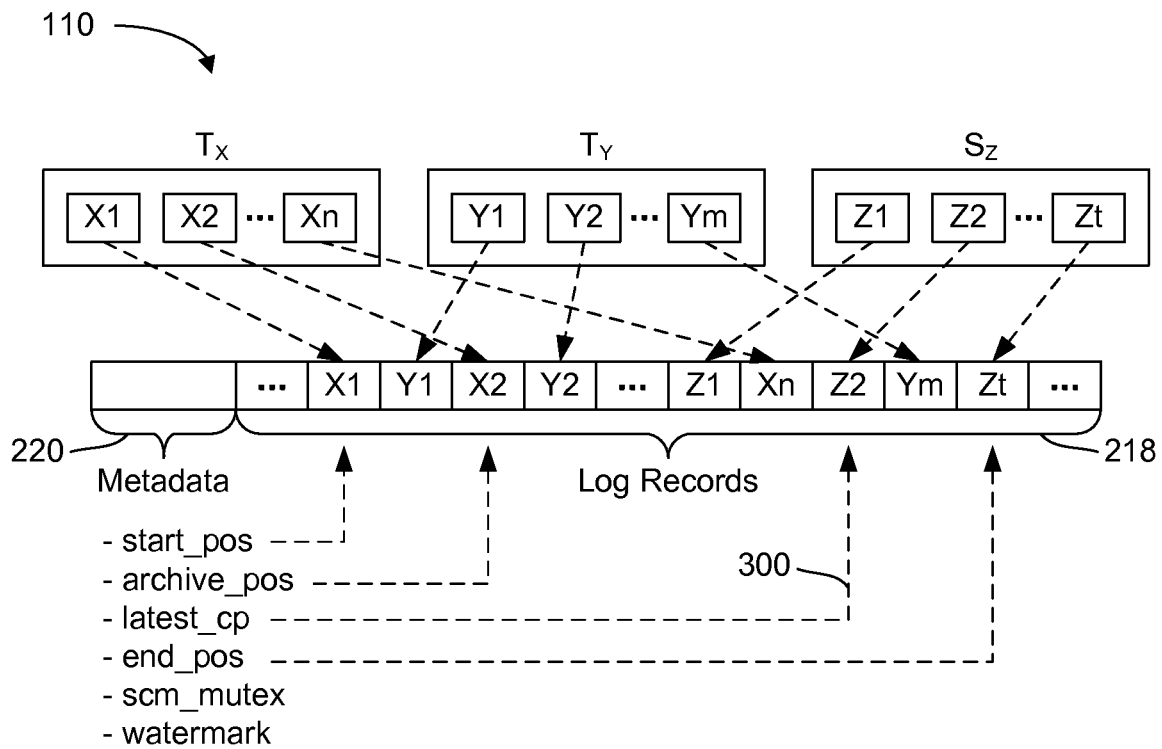
FIG. 3 depicts a schematic diagram of one embodiment of a log space.

FIG. 3 depicts a schematic diagram of one embodiment of a log space 110. The designated log space 110 on the persistent memory device 104 includes a set of attributes (stored in metadata 220) describing the log space 110. The metadata 220 may be saved in a header for the log space 110, and may describe attributes for the log space 110 including, but not limited to, a start position and an end position of log data, the last checkpoint position 300 in the log space 110, latch information, etc. The attributes described in the metadata 220 may include pointers to specific log records 218 or data allocation spaces within the log space 110. The metadata 220 may be retrieved or changed by the logging system 100 at any time, which allows the logging system 100 to accurately track and maintain the log space 110.

In one embodiment, as shown, the metadata 220 includes start_pos and end_pos pointers that point to the first and last log record 218, respectively, in the log space 110. The metadata 220 also includes an archive_pos pointer that indicates the location up to which all the log records 218 have already been archived on the data storage device 106. The metadata 220 may also include descriptive attributes relating to the log space 110 or log records 218 as a whole, such as scm_mutex, which indicates a latch of the log space 110, or watermark, which is a configurable parameter used to specify the level (percentage) of log space 110 used before automatically starting a log archival process. The log space manager 208 may periodically check the size taken by the log records 218 and other log data within the log space 110. Once the size is larger than the watermark, part of the log data is then archived to the data storage drive. The space taken by the archived log data may then be freed. In one embodiment, all of the log data in front of the latest checkpoint may be archived to the data storage device 106 when the watermark is reached, and the log data may be flushed from the log space 110 to make room for newer log data.

Each time the DBMS creates a checkpoint, the location of the checkpoint log record 300 may be saved by updating a latest_cp parameter in the header of the log space 110. Consequently, when the recovery subsystem 212 begins the recovery process, the recovery subsystem 212 may quickly find the latest checkpoint log record 300 by searching the metadata 220 in the log space header. This also allows the recovery subsystem 212 to only scan the log records 218 after the checkpoint log record 300 indicated in the latest_cp parameter and to apply the changes indicated by the scanned log records 218.

In one embodiment, the persistent memory device 104 is a PCM device. The update of any of the pointers or parameters within the metadata 220 may be done in an atomic way, such that no partial writes occur for the pointer updates. In an atomic 8-byte write primitive, partial writes do not occur within an 8-byte write and makes a pointer update an atomic operation on PCM. An epoch barrier primitive may also be used. The epoch barrier is a command that allows explicit communication of ordering constraints to PCM hardware. When the hardware sees an epoch barrier, the hardware makes sure that all the PCM writes before the epoch barrier are written through from caches before PCM writes after the epoch barrier are executed.

The log space 110 also includes the log records 218 corresponding to each of the transactions 116 received by the logging system 100 after the metadata 220. Each log record 218 is allocated in the log space 110 as one chunk or division. The log records 218 are stored in the persistent memory device 104 in the order received by the logging system 100, such that each new log record 218 is appended immediately after the previous log record 218. During the release process (for example, after log archival), log records 218 are removed from the head of the log stream. The released space is reclaimed and later reused by future log writings. In the embodiment of FIG. 5, the transaction threads, $T_X$ and $T_Y$, and the system thread, $S_Z$ (such as a checkpoint thread), write log records 218, $X_i$, $Y_j$, $Z_k$ ($i \in \{1, 2, \ldots, n\}$; $j \in \{1, 2, \ldots, m\}$; $k \in \{1, 2, \ldots, t\}$), directly into the log space 110 without caching the log records 218 in log buffers on DRAM or other volatile memory, or writing the log records 218 to log files 114 on the data storage device 106.

Figure 4:
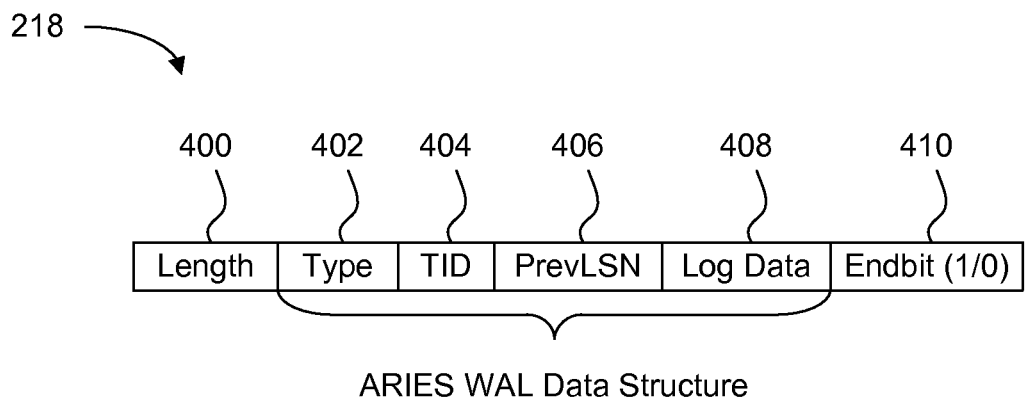
FIG. 4 depicts a schematic diagram of one embodiment of a log record.

FIG. 4 depicts a schematic diagram of one embodiment of a log record 218. In one embodiment, the logging system 100 uses at least some of the principles from the Algorithms for Recovery and Isolation Exploiting Semantics (ARIES) write-ahead logging (WAL) algorithm and data structure. In addition to the ARIES WAL data structure, the logging system 100 may use additional data fields or principles. In other embodiments, the logging system 100 may use other algorithms or principles to implement the logging system 100 using the persistent memory device 104.

In one embodiment, the data structure includes a length field 400, a type field 402, a transaction identification (TID) field 404, a previous log sequence number (PrevLSN) field 406, a log data field 408, and an endbit field 410. The type field 402, TID field 404, PrevLSN field 406, and log data field 408 are part of the ARIES WAL data structure. The length field 400 and endbit field 410 are added to the beginning and end of the log record 218, respectively, in one embodiment. The length field 400 describes the length of the log record 218. When a transaction 116 inserts a log record 218, the logging system 100 writes the length field 400 first. In one embodiment, the length field write is an atomic write because the length of the field 400 is 8 bytes. The endbit field 410 is used to indicate if the writing of the log record 218 is finished. If the writing is finished, the endbit field 410 is 1; otherwise, the endbit field 410 is 0. These two fields 400, 410 allow the recovery subsystem 212 to determine if there is any hole in the log space 110, or if there is any partial write of a log record 218, and to subsequently fix the problem. Correct ordering of the fields in the log record 218 may be able to guarantee the correctness of the recovery process during a system crash. Epoch barriers may be used to ensure the correct ordering of the fields.

FIG. 5 depicts a flow chart diagram of one embodiment of a method 500 for logging. Although the method 500 is described in conjunction with the logging system 100 of FIG. 1, embodiments of the method 500 may be implemented with other types of logging systems 100.

The logging system 100 receives 502 a transaction 116 to write data to a data storage device 106. The transaction 116 may be sent from a computing device within the database or from a computing device external to the database. The transaction 116 may include any interaction with one or more servers storing data on the database. The logging system 100 includes a memory device, such as a DRAM device 102 or other volatile memory device, that may include a data buffer 108 or a cache to temporarily store data from the transaction 116. The logging system 100 writes 504 the transaction data to the data buffer 108 on the memory device. The data buffers 108 may hold the data while the data is being used, while an application corresponding to the data is being used, or for as long as needed to write the data to the data storage device 106. Data storage devices 106 such as HDDs typically write slower than memory devices, so the memory device may store the data until the data storage device 106 is ready to receive the data. The memory device then writes 506 the data to data files 112 on the data storage device 106, where the data may be stored long-term.

The transaction 116 also includes log data to be stored on and used by the database. The log data is stored on a separate, persistent memory device 104, apart from the other transaction data. In one embodiment, the persistent memory device 104 is an SCM device using PCM. The logging system 100 first allocates 508 a chunk in a log space 110 on the SCM device where the transaction log data is to be stored. The size of the log space 110 may be determined by the size of the log data, including log metadata 220 and log records 218, that is to be stored in the log space 110. The logging system 100 writes 510 the transaction log data to the allocated log space 110. In one embodiment, a log space manager 208 manages the allocation of the log space 110 and writing of the log data to the log space 110. The allocation of the log space 110 may depend on the log records 218 received by the persistent memory device 104.

Because the SCM device is a persistent memory device 104, the log data may be stored on the SCM device long-term, rather than temporarily, thus eliminating or reducing the need to write the log records 218 to the data storage device 106 for long-term storage. The SCM device may store the log records 218 such that a recovery subsystem 212 may access the log records 218 at the SCM device to restore a database state, rather than retrieving the log records 218 at the data storage device 106. In some embodiments, when the log space 110 on the SCM device is full, and no more room may be allocated for log records 218, the SCM device may archive 512 the log data to the data storage device 106. The archiving process may be done asynchronously with respect to writing the other transaction data to the data storage device 106, potentially reducing much of the overhead associated with processing transactions 116 in a database.

In one embodiment of the system and method described herein, when a database is first created and opened, the log space manager 208 retrieves the configuration information of the log space 110 from a configuration file. The configuration information includes the request size of the log space 110, a suggested virtual start address, and other information that allows the log space manager 208 to interact with the OS 210. The log space manager 208 then invokes OS interfaces to allocate and attach a segment in the log space 110. In one embodiment, the OS 210 returns a unique identifier to the log space manager 208, which then saves the unique identifier in the configuration file for future restarts of the database and creates the metadata 220 in the header of the log space 110.

The log space manager 208 may also perform operations to aid the recovery subsystem 212 in disaster recovery, such as periodically flushing and archiving the log records 218 to the data storage device 106 for long-term storage. The recovery subsystem 212 is used to restore the database to a desired state after a DBMS crash, loss of power, data storage device 106 replacement, or any event that may prevent access to or corrupt at least some of the log records 218 or data. In some embodiments, not shown, the recovery subsystem 212 may be an external system that interfaces with the DBMS for disaster recovery.

On a subsequent restart of the database, the log space manager 208 reads the identifier of the log space 110 from the configuration file. Using this identifier, the log space manager 208 invokes OS interfaces to find and reattach the database to the log space 110. If the DBMS finds that the database was abnormally shutdown previously, the recovery process is started to recover the database state. The recovery process reads the log records 218 directly from the log space 110 instead of log files 114 on the data storage device 106. The log space 110 and/or the log space header may be updated to reflect the initialized/recovered status.

When a transaction thread or system thread attempts to write a log record 218 to the log space 110, the log space manager 208 allocates a chunk or division in the log space 110 according to the size of the log record 218 and returns a pointer corresponding to the chunk to the thread. The thread may then write the log record 218 to the chunk. One example of pseudo code for such an operation is shown:

```
Algorithm AllocateLogSpace
input: log size of nbytes
begin
1      if free space < nbytes then
2          archive log data to obtain enough free spaces request latch
               of allocation
3      allocate nbytes + 9 bytes from current end_pos
4      // The extra 9 bytes are used by the length and the endbit fields
5      write the length field to be nbytes + 9
6      write the endbit field to be 0
7      write epoch barrier
8      log_pointer = end_pos + 8
9      end_pos = end_pos + nbytes + 9
10     write epoch barrier
11     release latch
12     return log_pointer
end
Algorithm WriteALogRecord
input: log_pointer
begin
1      memcpy log data starting at log_pointer
2      write epoch barrier
3      update the endbit field to be 1
end
```

The log space manager 208 first allocates the log space 110 using the AllocateLogSpace Algorithm. For example, if a thread is attempting to allocate a chung with size, nbytes, in the log space 110, the log space manager 208 checks if the size of free space is larger than nbytes. If it is not true, the log space manager 208 attempts to archive and remove log data currently stored in the log space 110. From the current end log position, the log space manager 208 creates the length and endbit fields 400, 410. During allocation, the log space manager 208 sets the endbit field 410 as 0, indicating that writing is not complete. The pointer to the end log position is moved to the new position, which is nbytes+9 bytes from the current position, and returns the starting address of the log data to the caller thread.

With the returned pointer, the log space manager 208 uses the WriteALogRecord to write a log record 218 for the transaction 116. The log space manager 208 uses a memory copy function to write or copy the log record 218 directly to the allocated chunk, and then updates the endbit field 410 to 1 to indicate the completion of the log writing. Epoch barriers may be used between some writes to ensure the ordering of the writes, for example, that the length field and endbit field 410 are correctly positioned and fully initialized before writing the log data.

To guarantee that the end position is updated correctly in the log space metadata 220, an epoch barrier may be issued after changing the end position field. Since any allocations may change the end position, this becomes a frequently accessed/modified location. Each request thread updates this field in the persistent memory device 104 (SCM in one example, though any persistent memory may be used in the persistent memory device 104) and writes an epoch barrier. As a result, epoch barriers may be used frequently on the same field, which may affect the write performance due to massive write through operations.

One optimization strategy includes maintaining a copy of the end position value on the DRAM device 102 or other volatile memory device and synchronize it to the SCM device periodically. When a thread requests a chunk from the log space 110, the log space manager 208 uses the DRAM copy of the end position to allocate space for the chunk. A counter may also be kept in the DRAM to remember the allocated sizes since the last synchronization of the end position field in the SCM device. When the requested size is equal to or larger than a predefined synchronization threshold, synchronization is issued to write the value of the end position to the SCM device. This optimization allows line 9 of the AllocateLogSpace may be done in the DRAM device 102 in most cases, and line 10 may then be unnecessary for those updates. If the system crashes when the latest value of the end position has not been written to the SCM device, then the recovery component scans the log data up to the position of the end position+the synchronization threshold at most.

In one embodiment, latch management may be used to synchronize the allocation of the log space 110. Because the log space 110 is a linear and continuous space, each new log record 218 is appended after the previous log record 218. Consequently, when a transaction thread or a system thread requests a chunk of the log space 110, the system first acquires a latch from the log space manager 208 on the tail of the log stream. When the allocation is completed and the log space metadata 220 is updated, the system releases this latch. The thread may then write log data in to the allocated chunk while another thread may obtain the latch for its own chunk allocation.

The log space manager 208 may also be responsible for updating the metadata 220 when any change occurs in the log space 110, such as when adding a new log record 218 to the log space 110. Other DBMS subsystems 216 may retrieve the metadata 220 of the log space 110 through the interfaces provided by the log space manager 208. For example, the recovery subsystem 212 may obtain the location of the latest checkpoint saved in the log space header, which assists the recovery subsystem 212 in finding the location to start scanning the log records 218 to recover the database appropriately. To accomplish this, the recovery subsystem 212 may first acquire the address of the log space 110 on the persistent memory device 104. The recovery subsystem 212 may then locate the most recent checkpoint log record and read each log record after the checkpoint log record to restore a system state that existed before the crash or other disaster occurred.

The log space data may be asynchronously saved or archived to the data storage device 106 periodically to aid in disaster recovery. In some embodiments, the log space manager 208 archives the log data to some persistent storage at a remote location. If a disaster or crash occurs within the database, the archived log data may be used to restore the log data and recover the database.

In one embodiment, a scan and analysis algorithm may be used to solve some of the potential problems that may occur in a DBMS. The algorithm is described below:

```
Algorithm Restart Analysis
input: scm_log_start_address, sync_threshold
begin
 1      access log metadata from scm_log_start_address
 2      current_pos = the log position after the latest checkpoint log
        record
 3      while current_pos < end_pos + sync_threshold
 4          length = read the length field of the log record at the
 current_pos address
 5          if length == 0 then
 6              break // the end of the log
 7          endbit = read the end bit field of the log record using
 current_pos and length information
 8          if endbit = 0 then
 9              // This is a hole or partially written log, skip it
10              current_pos = current_pos + length
11              continue
12          logdata = read the log data at current_pos
13          begin the normal database recovery analysis using logdata
end
```

During a restart analysis phase, the recovery subsystem 212 scans the log records 218 from the position of the latest checkpoint log record 300. Because a copy of the end position may be kept in the DRAM device 102, and the system may crash when the DRAM copy has not been synchronized to the SCM copy, the recovery subsystem 212 may not be able to simply scan the log records 218 until the end position because it may not be the latest end position of the log records 218. Consequently, the recovery analysis passes scans the log records 218 until the end position plus the predefined synchronization threshold at most. Then, for each log record 218, the length field 400 is checked. If the value of the length field 400 is 0—meaning that it is the end position of the log records 218—the scanning may be stopped.

If the value of the length field 400 is not 0, then the endbit position is calculated using the value of the length field 400. If the endbit field 410 is 0, the transaction 116 has allocated this chunk in the log space 110 and the writing of log data has not been finished. The log record 218 is considered to be a hole or partial write log record and should be bypassed during recovery. Otherwise, the writing of the log data is finished and the redo or undo phase may be continued on the log record 218.

If the database finishes taking a checkpoint and has not created a checkpoint log record 300 or updated the latest checkpoint field in the log space header, the analysis may be started from the position of the next-to-last checkpoint log record 300, in some embodiments.

In one embodiment of the recovery process, the log records 218 do not need to be loaded from log files 114 on a data storage device 106 to a log buffer. The recovery subsystem 212 may only require the address of the log space 110. The recovery subsystem 212 may also obtain the location of the latest checkpoint log record 300 from the log space header. The recovery subsystem 212 may then directly read the log records 218 in the log space 110 from the latest checkpoint log record 300 and apply redo and undo functions to restore the database state. After recovery, the recovery subsystem 212 may create a new checkpoint and update the latest checkpoint field in the log space metadata 220.

An embodiment of a logging system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation for logging in a computing environment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. A computer readable storage medium or device is a specific type of computer-readable or—usable medium. Examples of a computer-readable storage medium include a semiconductor or solid state memory, magnetic tape, a removable computer diskette, a random access memory (RAM), a read-only memory (ROM), a rigid magnetic disk, and an optical disk. Hardware implementations including computer readable storage media also may or may not include transitory media. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
a computer readable storage device to store a computer readable program, wherein the computer readable program, when executed by a processor within a computer, causes the computer to perform operations for logging, the operations comprising:
receiving a transaction comprising data and a log record corresponding to the data;
separating the data and the log record corresponding to the data;
writing the data to a memory buffer on a main memory device for at least temporary storage in the main memory device;
writing the log record directly to a log space on a persistent memory device that is separate from the main memory device for at least temporary storage in the persistent memory device, wherein the persistent memory device is a storage class memory device comprising phase change memory, wherein the log record is written to the persistent memory device without any intervening cache of the log record in the memory buffer storing the data, a log buffer, and/or other volatile memory device;
storing the data from the memory buffer to a data file on a data storage device via a first write operation; and
archiving the log record to a log file on the data storage device via a second write operation that is separate from the first write operation in response to a predetermined condition of the log space,
wherein the second write operation is asynchronous with respect to the first write operation, and
wherein the data storage device, the main memory device, and the persistent memory device are different devices.

2. The computer program product of claim 1,
wherein the predetermined condition of the log space comprises a determination that a size of log records and other data within the log space is above a watermark, the watermark comprising a configurable parameter used to specify a level of log space used before starting a log archival process.

3. The computer program product of claim 1, wherein the computer program product, when executed on the computer, causes the computer to perform additional operations, comprising:
managing a plurality of log records in the log space using a log space manager on the persistent memory device according to the log records received by the persistent memory device.

4. The computer program product of claim 3, wherein the log space manager is further configured to:
communicate with an operating system corresponding to the logging system to initialize and remove the log space on the persistent memory device according to the log records received by the persistent memory device; and
allocate chunks on the log space for subsystems within the logging system to write the log records.

5. The computer program product of claim 1, wherein the computer program product, when executed on the computer, causes the computer to perform additional operations, comprising:
  acquiring an address of the log space on the persistent memory device;
  locating a most recent checkpoint log record;
  reading each log record after the checkpoint log record; and
  restoring a system state.

6. A method for logging, comprising:
  receiving a transaction comprising data and a log record corresponding to the data;
  separating the data and the log record corresponding to the data;
  writing the data to a memory buffer on a main memory device for at least temporary storage in the main memory device;
  writing the log record directly to a log space on a persistent memory device that is separate from the main memory device for at least temporary storage in the persistent memory device, wherein the persistent memory device is a storage class memory device comprising phase change memory, wherein the log record is written to the persistent memory device without any intervening cache of the log record in the memory buffer storing the data, a log buffer, and/or other volatile memory device;
  storing the data from the memory buffer to a data file on a data storage device via a first write operation; and
  archiving the log record to a log file on the data storage device via a second write operation that is separate from the first write operation in response to a predetermined condition of the log space,
  wherein the second write operation is asynchronous with respect to the first write operation, and
  wherein the data storage device, the main memory device, and the persistent memory device are different devices.

7. The method of claim 6,
  wherein the predetermined condition of the log space comprises a determination that a size of log records and other data within the log space is above a watermark, the watermark comprising a configurable parameter used to specify a level of log space used before starting a log archival process.

8. The method of claim 6, further comprising managing a plurality of log records in the log space using a log space manager on the persistent memory device according to the log records received by the persistent memory device.

9. The method of claim 8, wherein the log space manager is further configured to:
  communicate with an operating system corresponding to the logging system to initialize and remove the log space on the persistent memory device according to the log records received by the persistent memory device; and
  allocate chunks on the log space for subsystems within the logging system to write the log records.

10. The method of claim 6, further comprising:
  acquiring an address of the log space on the persistent memory device;
  locating a most recent checkpoint log record;
  reading each log record after the checkpoint log record; and
  restoring a system state.

11. A logging system, comprising:
  a processor configured to:
    receive a transaction comprising data and a log record corresponding to the data; and
    separate the data and the log record corresponding to the data;
  a main memory device comprising a data buffer configured to at least temporarily store the data corresponding to the transaction;
  a persistent memory device comprising a log space configured to directly and at least temporarily store the log record corresponding to the transaction without any intervening cache of the log record in a log buffer, the memory buffer and/or other volatile memory device, wherein the persistent memory device is a storage class memory device comprising phase change memory;
  a data storage device coupled to the persistent memory device and the main memory device, wherein the data storage device comprises:
  a data file configured to store the data from the memory buffer on the main memory device in a first operation; and
  a log file configured to archive the log record from the log space on the persistent memory device in a second write operation file and in response to a predetermined condition of the log space, wherein the second write operation is asynchronous with respect to the first write operation.

12. The system of claim 11, wherein the persistent memory device further comprises a log space manager configured to manage a plurality of log records in the log space on the persistent memory device according to the log records received by the persistent memory device.

13. The system of claim 12, wherein the log space manager is further configured to:
  communicate with an operating system corresponding to the logging system to initialize and remove the log space on the persistent memory device according to the log records received by the persistent memory device; and
  allocate chunks on the log space for subsystems within the logging system to write the log records.

14. The system of claim 11, further comprising a recovery subsystem configured to:
  acquire an address of the log space on the persistent memory device;
  locate a most recent checkpoint log record;
  read each log record after the checkpoint log record; and
  restore a system state.

15. The system of claim 11, wherein:
  the predetermined condition of the log space comprises a determination that a size of log records and other data within the log space is above a watermark, the watermark comprising a configurable parameter used to specify a level of log space used before starting a log archival process.

* * * * *